United States Patent [19]
Gaud et al.

[11] Patent Number: 5,604,973
[45] Date of Patent: Feb. 25, 1997

[54] PROCESS FOR THE PRODUCTION OF A VERTICAL MAGNETIC HEAD

[75] Inventors: Pierre Gaud, St Egreve; Henri Sibuet, le Fontanil; Brigitte Desloges, Seyssins, all of France

[73] Assignee: Commissariat a l'Energie Atomique, Paris, France

[21] Appl. No.: 393,359

[22] Filed: Feb. 23, 1995

[30] Foreign Application Priority Data

Mar. 1, 1994 [FR] France .................................. 94 02330

[51] Int. Cl.⁶ .................................................. G11B 5/42
[52] U.S. Cl. .................... 29/603.15; 29/603.18; 360/125
[58] Field of Search ...................... 29/603.13, 603.14, 29/603.15, 603.18; 360/125–127

[56] References Cited

U.S. PATENT DOCUMENTS 5,062,196  11/1991  Deroux-Dauphin ...................... 29/603

FOREIGN PATENT DOCUMENTS 0418127  3/1991  European Pat. Off. .

OTHER PUBLICATIONS

Patent Abstracts of Japan, vol. 16, No. 442 (P–1421), Sep. 16, 1992, JP–4–153907, May 27, 1992.
Patent Abstracts of Japan, vol. 17, No. 366 (P–1571), Jul. 9, 1993, JP–5–054326, Mar. 5, 1993.

*Primary Examiner*—Carl E. Hall
*Attorney, Agent, or Firm*—Oblon, Spivak, McClelland, Maier & Neustadt, P.C.

[57] ABSTRACT

A process for a production of a vertical magnetic head. With this process of producing a vertical magnetic head, a magnetic spacer defining a head gap is formed. This magnetic spacer is formed from a same material as a substrate of the vertical magnetic head. Such a vertical magnetic head has particular application to magnetic recording and reproducing.

6 Claims, 9 Drawing Sheets

PROCESS FOR THE PRODUCTION OF A VERTICAL MAGNETIC HEAD

DESCRIPTION

1. Technical Field

The present invention relates to a process for producing a vertical magnetic head and to a head obtained by the process.

Its preferred application is in general public video recording. However, it can also be used in other fields, such as data backups or computer memories.

2. Prior Art

A magnetic recording support for video equipment, data backups or computer memories comprises several tracks on which are entered informations in the form of magnetic domains.

In order to increase the information density, there is an increase not only in the number of informations per track unit length, but also in the number of tracks. For this purpose the width of the tracks is decreased and simultaneously the gap separating them is reduced until they are rendered contiguous.

In order to meet these objectives, at present there are mainly two types of heads on the market, so-called metal-in-gap heads and sandwich heads.

FIG. 1 illustrates an example of a head of the second type. The head shown has a substrate 2 supporting a magnetic circuit 4 constituted by a magnetic layer deposited on the upper face of the substrate, the circuit having at the front two pole pieces 5, 7 separated by a head gap 6 formed by an amagnetic spacer. Above the magnetic circuit the head also has an amagnetic superstrate 2'. The head also has an opening 8 made through the magnetic layer, the substrate and the superstrate, as well as a conductor winding 9 passing through the opening 8.

The head shown in FIG. 1 is intended to cooperate with a recording support 20 oriented perpendicular to the substrate (or, what amounts to the same thing, parallel to its edge).

This type of head can be called "vertical" in the sense that the active surface is perpendicular to the surface of the initial substrate.

The width of the head gap, designated l, is counted perpendicular to the substrate (or, what amounts to the same thing, parallel to the recording support). Its length, designated L, is counted in the direction of the relative displacement of the head and the support. The height of the head gap, designated h, is counted parallel to the face of the substrate supporting the magnetic circuit. In the case of head wear, it is the height h which is reduced.

There is no confusion between such heads and so-called horizontal heads, where the head gap is level with the upper face parallel to the substrate and where the recording support moves parallel to the substrate face. A horizontal head is e.g. described in FR-A-2 604 021.

One of the essential differences between vertical heads of the sandwich type and horizontal heads, apart from obvious differences in their structure and production process, is due to the fact that in the latter case the width of the head gap, corresponding to the track width, is defined by lithography, whereas the dimension affected during the wear of the head is defined by the thickness of the deposited magnetic material. In sandwich-type vertical heads it is the width of the head gap which is defined by the magnetic material thickness, whereas the admissible maximum wear is adjusted by lithography.

The practical implementation of vertical heads of the sandwich type, like that of FIG. 1, involves a large number of micromechanical and high temperature welding operations, usually performed in a unitary manner.

Certain production processes are in particular described in the work entitled "Recent Magnetics for Electronics", Jarect, vol. 10, chapter 11, pp. 121–133, 1983, published by Y. Sakurai, North-Holland and also in the wor entitled "The Complete Handbook of Magnetic Recording", F. Jorgensen, chapter 9, pp. 196–216, 1988, published by Tas Books Inc.

However, international application WO 92/02015 proposes a process for the production of sandwich-type magnetic heads, which makes it possible to obtain a very well controlled vertical head gap, whose width is equal to that of the track to be read or written and with an alignment of the pole pieces obtained without any difficulty. These magnetic heads accept without any problem the inevitable wear associated with the friction of the magnetic tape on the head.

The attached FIGS. 2a to 2d diagrammatically illustrate this known process. One starts with a substrate 16 and, by different etching operations, some of which are anisotropic, as well as a thermal oxidation process, a vertical wall 24 on the substrate is obtained (FIG. 2a). When the substrate is made from silicon, the wall 24 is made from silicon oxide or in other words silica. A magnetic layer 26 is then deposited on either side of the wall and is then planarized (FIG. 2b). The wall 24 then serves as an amagnetic spacer. The magnetic circuit 28 is then defined in its overall form by photolithography (FIG. 2c). The assembly is covered by a not shown superstrate and is given an opening 34 (FIG. 2d). Two notches 36 are machined and a conductor 38 is passed into the opening 34, into the notches 36 and wound around the magnetic circuit 28. A friction surface 41 is finally machined in the assembly. This surface is perpendicular to the upper face of the substrate. Thus, the spacer 24 is level with the edge of the machined substrate and parallel to the recording support (not shown, but perpendicular to the plane of the drawing).

Although satisfactory in certain respects, this process suffers from a disadvantage. Thus, the spacer 24 obtained is made from a thermal oxide. However, it has been found that this causes stability or straightness problems in the case where the ratio between the width l and the length L of the spacer is large (in practice exceeding 20). This effect is due to a release of the stresses present in the spacer during the second etching of the silicon, the foot of the spacer being fixed, whereas its top is free. The reason is the difference in the nature between silicon and its thermal oxide (in particular expansion coefficient difference).

WO 92/02015 proposes other implementation forms, in which deposition firstly takes place of a magnetic material on one side of the vertical oxide wall, before carrying out the second silicon etching. However, the corresponding process is complex and increases the number of lithography -etching-planarization sequences, so that it is scarcely suitable.

The present invention aims at obviating these disadvantages.

DESCRIPTION OF THE INVENTION

According to the invention, a spacer is produced, which is no longer of thermal oxide, but which is made from the same material as that forming the substrate, e.g. silicon if the substrate is made from this material. Moreover, the operations are simple and the magnetic circuit is produced in a single stage.

More specifically, the present invention relates to a process for the production of magnetic heads of the type defined hereinbefore and which includes the following operations:

an etching of the substrate is performed through a first mask in order to form a pre-recess of limited depth, in the pre-recess is formed a thin material layer able to constitute a mask for a subsequent etching of the substrate, the thin layer is eliminated over at least part of the bottom of the pre-recess, whilst allowing it to remain at least along one of the vertical walls of the pre-recess, a second mask is defined with an opening, which leaves free the pre-recess and the substrate on the side of the vertical wall covered by the thin layer, the assembly is etched through the second mask, the thin layer remaining against the wall serving as a mask and preserving below it a vertical wall formed from the material constituting the substrate, the etching leading to the appearance of a first recess and a second recess separated by the vertical wall of the material constituting the substrate, the remaining layers above the substrate are eliminated, the first and second recesses are filled with a magnetic material, the assembly is planarized parallel to the substrate at least up to the vertical wall, which leaves two pole pieces separated by the vertical wall, which thus constitutes the amagnetic spacer of the head, a superstrate is deposited, the assembly is machined in order to define a friction surface perpendicular to the surface of the substrate, the amagnetic spacer being level with the friction surface.

This process can use any conductor winding type and in particular a conductor winding wound through an opening (as in the case of FIG. 1).

The present invention also relates to a head obtained by the process defined hereinbefore. In this head is its head gap is formed by an amagnetic spacer made from the material forming the substrate. Thus, there is perfect compatibility between the substrate and the spacer. When the substrate is made from silicon, the gap is constituted by a vertical silicon wall.

DETAILED DESCRIPTION OF AN EMBODIMENT

In the following description it will be assumed, in a non-limitative manner, that the substrate used is of silicon and more specifically monocrystalline silicon of crystal orientation <110>.

Figure 3A:
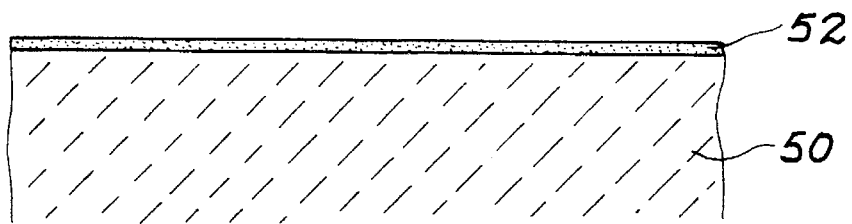
FIGS. 3a to 3q Show various stages in a production process according to the invention.

Thus, the starting product is a substrate 50 in FIG. 3a and deposition takes place of a first etching mask 52, e.g. of silicon nitride. This first mask can be obtained by low pressure vapour chemical deposition and it can have a thickness of about 40 nm.

Figure 3B:
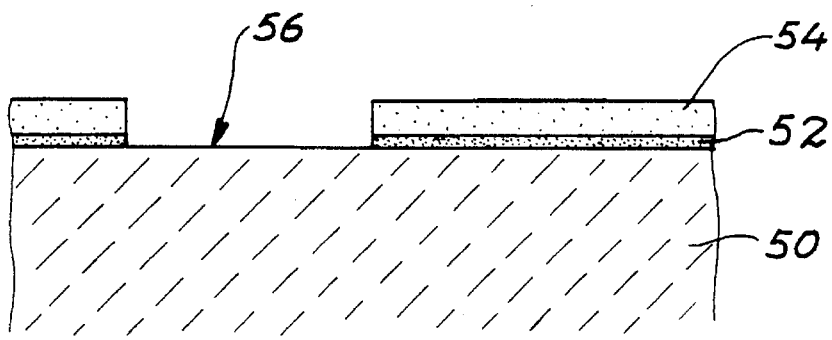

By photolithography using a resin layer 54, an opening 56 is made in the first silicon nitride mask (FIG. 3b). The etching can be a reactive ionic etching. The resin mask 54 is then removed, e.g. chemically with a nitric acid solution.

Figure 3C:
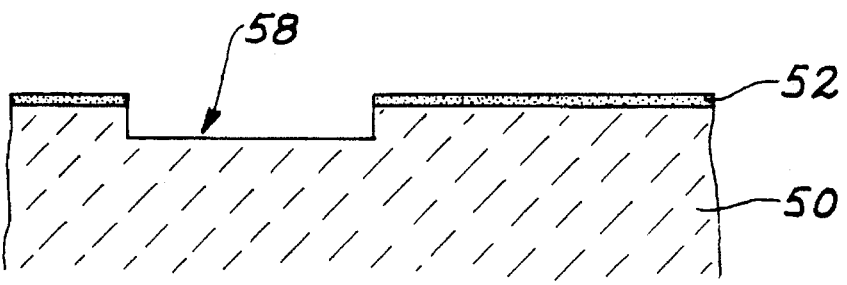

This is followed by the etching of the silicon substrate (FIG. 3c) in order to obtain a pre-recess 58 with a depth of a few tenths of a micron. In order to do this, use is e.g. made of a KOH solution with a concentration of 40% and at 70° C. When the substrate has no buried barrier layer, the depth of the pre-recess is a function of the sought geometry. It is a question of obtaining a compromise between a limited depth, which will minimize the asymmetry of the pole pieces obtained on each side of the spacer and a deeper etching, which will facilitate the subsequent obtaining of the mask necessary for the etching of the silicon for defining the spacer. For example, for a final recess depth of 5 µm, a depth of 0.3 µm can be adopted for the pre-recess 58.

Figure 3D:
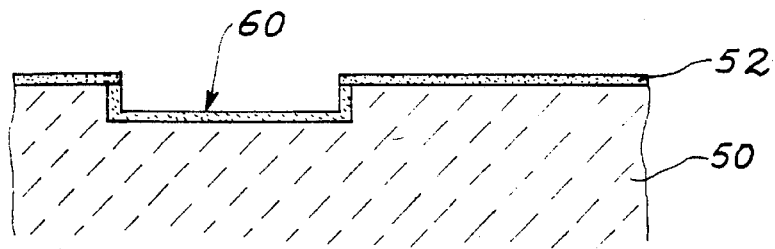

This is followed by the deposition of a layer 60 of a material able to serve as a mask for a subsequent silicon etching operation (FIG. 3d). It is e.g. possible to carry out a thermal oxidation of the silicon and in this case the layer 60 is of silicon oxide (silica). The thickness of the layer 60 is directly linked with the length of the desired head gap (counted in the movement direction of the recording support, i.e. horizontally in FIG. 3d). For example, a thermal oxidation of 0.3 µm can be carried out for a desired gap length of 0.2 µm.

Figure 1:
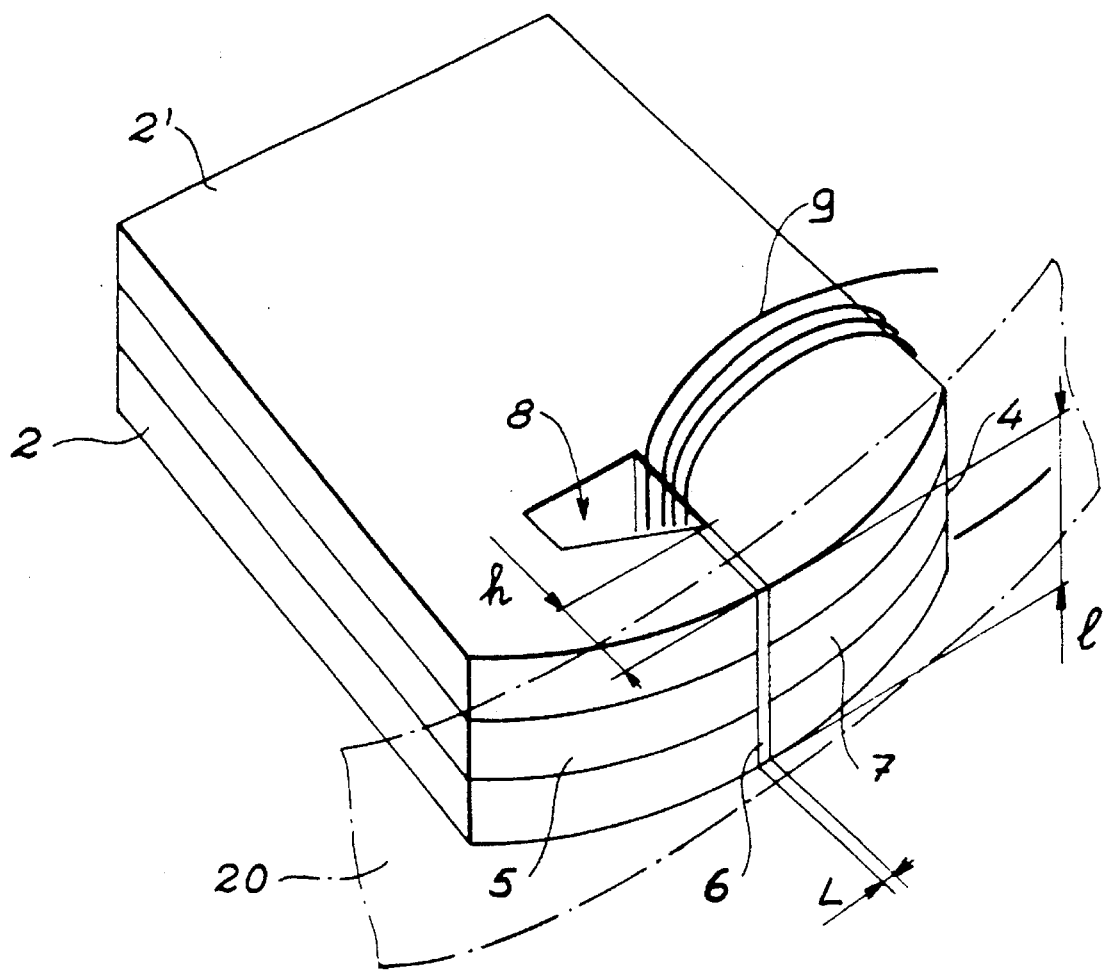
FIG. 1 Already described, shows a prior art vertical magnetic head.
Figure 2A:
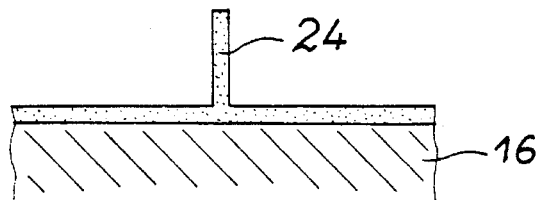
FIGS. 2a, 2b, 2c & 2d Show four stages of a known process for producing a vertical magnetic head.
Figure 2B:
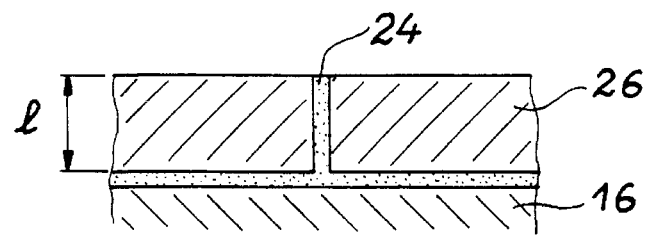
Figure 2C:
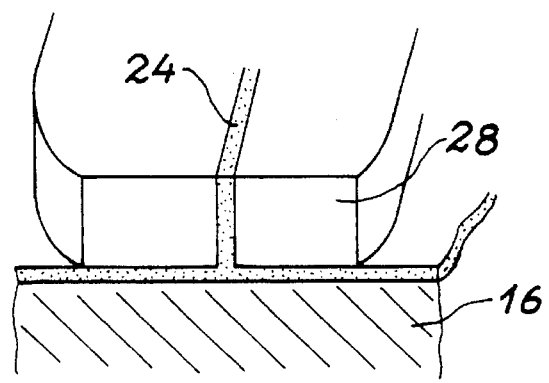
Figure 2D:
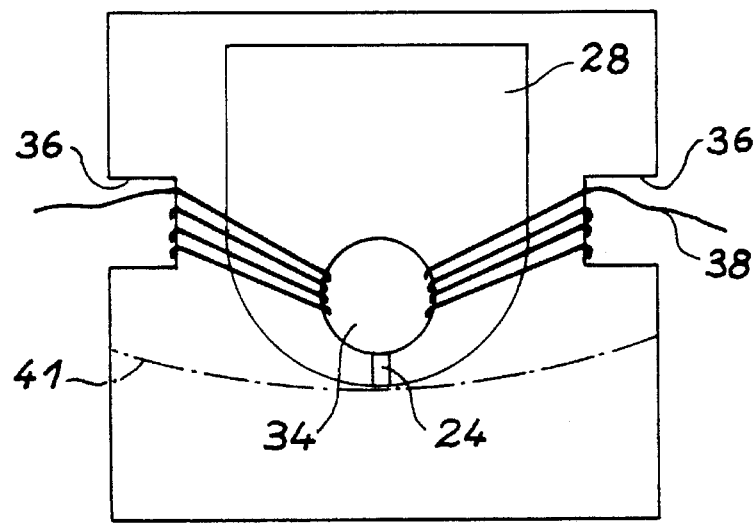
Figure 3E:
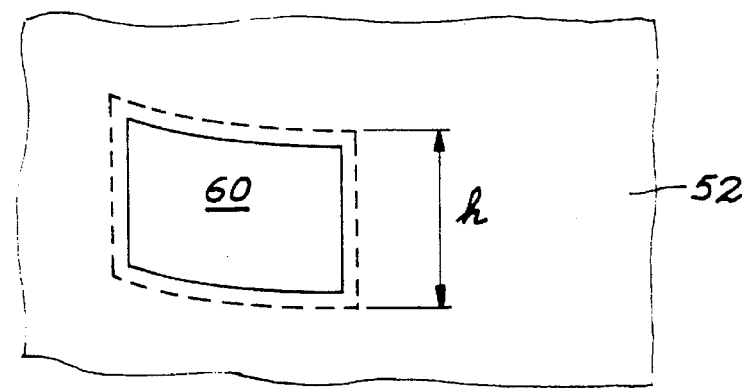

FIGS. 3a to 3d are sections along a plane parallel to the plane of the future recording support, or in other words sections perpendicular to the upper face of the silicon substrate. However, FIG. 3e is a plan view of the assembly. It is possible to see the silicon nitride mask 52 and its opening in which the pre-recess has been etched, together with the silicon oxide layer 60 covering the prerecess. The dimension h represents what has been called in connection with FIG. 1 the "height" of the future head gap, but this dimension is not critical. It also evolves by decreasing as the wear of the head progresses.

Figure 3F:
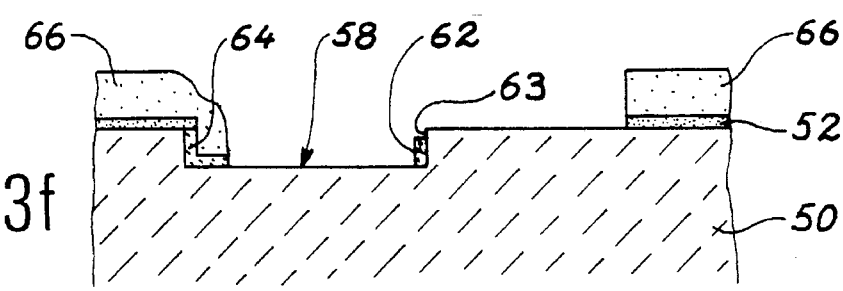

This is followed by the anisotropic etching of the initial mask 52 and the material 60. For this purpose deposition takes place of a resin mask 66 and an opening is defined which frees the pre-recess and the upper face of the substrate on one of the sides of the pre-recess (FIG. 3f). By reactive ionic etching the silicon nitride 52 is removed together with the material 60, which is only left behind on the side walls of the pre-recess (particularly the right-hand wall 63) in the form of layers 62 and 64. The mask 66 can be removed at this stage of the process by any known means.

Figure 3G:
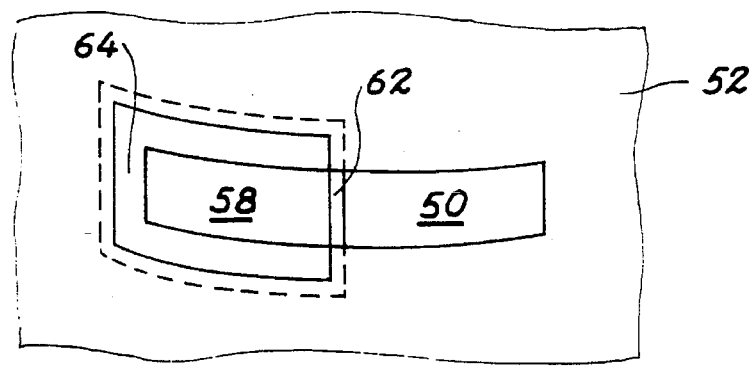

FIG. 3g shows the assembly obtained at this stage in plan view. The layer 62 remaining along the wall 63 will form a mask for etching the silicon. This etching is an anisotropic etching process, e.g. using a KOH solution in a concentration of 40% at 70° C. The depth of the etching corresponds to the desired head gap width (counted perpendicular to the substrate, i.e. parallel to the recording support). This width must correspond to the width of the track to be read.

Figure 3H:
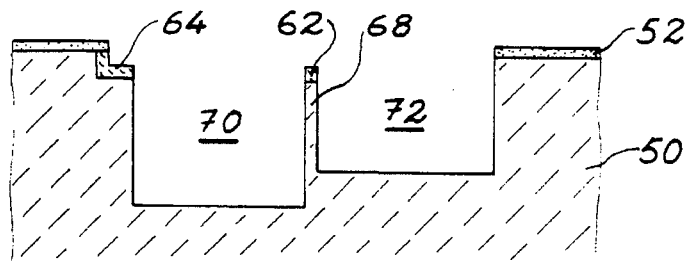

Thus, FIG. 3h shows a first and a second recesses, respectively 70 and 72, separated by a vertical wall 68, which has been saved during the etching as a result of the mask 62. This vertical wall 68 is necessarily made from the material forming the substrate, as a result of its formation method. It is therefore of silicon if the substrate is made from this material.

This is followed by the elimination of all the remaining layers above the substrate, i.e. both the silicon nitride layer 52 and the silicon oxide layers 62, 64. This elimination can e.g. take place by reactive ionic etching. This gives the assembly illustrated in FIG. 3i in a section perpendicular to the upper surface of the substrate and in FIG. 3j in plan view. More particularly in the latter, it is possible to see the two recesses 70, 72 surrounded by the silicon constituting the substrate 50.

Deposition then takes place, preferably by cathodic sputtering, of an electrically conductive, locking under-layer 74, e.g. of iron-nickel (FIG. 3k) and in a thickness of approximately 0.1 μm.

The third resin mask 76 is then deposited (FIG. 3l) in which is formed an opening 77, which frees the two recesses 70, 72 and part of the substrate around the recesses. In the opening electrolytic growth takes place of a magnetic material 78 using the layer 74 as the electrode. The thickness obtained must exceed the depth of the recesses, so that the magnetic material 78 surmounts the vertical wall 68. For example, if the recesses have a depth of 5 μm, 6 μm of magnetic material 78 will be deposited.

Figure 3I:
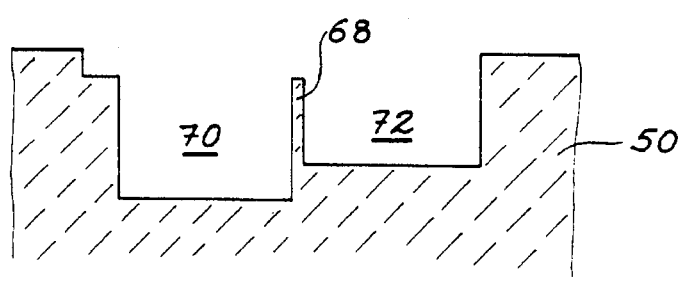
Figure 3J:
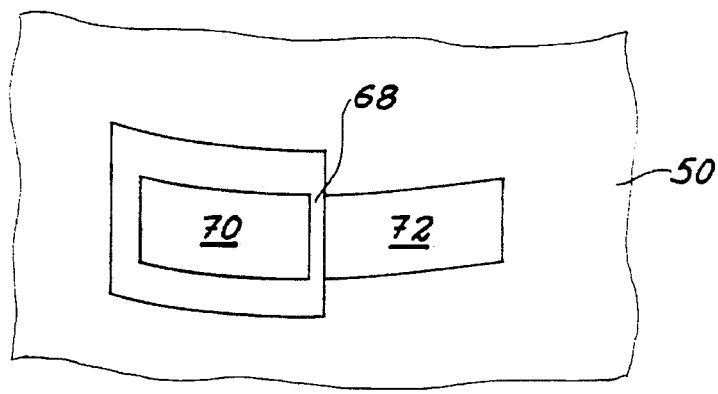

This is followed by the removal of the resin 76 which has formed the third mask, e.g. chemically using a solvent. The FeNi underlayer used for electrolysis is also eliminated over the periphery of the magnetic part 78, e.g. by ionic machining. The latter etching operation attacks the surface of the substrate at the periphery. The assembly obtained is illustrated in FIG. 3m in a section perpendicular to the substrate surface and in FIG. 3n in plan view. In the latter, it is possible to see the magnetic part 78 as an island surrounded by silicon.

The assembly is then planarized until the vertical wall 68 is reached for separating the magnetic materials within the two recesses. FIG. 3o shows the assembly in section and FIG. 3p in plan view. It is possible to see the magnetic material separated into two pole pieces 80, 82 separated by the silicon wall 68 serving as an amagnetic spacer (the locking layer 78 deposited on either side of the silicon wall 68 not forming part of the amagnetic spacer, because as the layer is of iron-nickel it is magnetic). The width of these two pole pieces, considered parallel to the spacer, is not exactly the same as a result of the etching of the pre-recess 58 illustrated in FIG. 3c. However, the difference is small. The width l in FIG. 3o corresponds to the part where the two pole pieces 80, 82 face one another. This width is the head gap width, considered parallel to the recording support.

This assembly is then covered by a not shown superstrate. The head is then finished by the conventional operations of producing a conductor coil, e.g. by making an opening and the winding of a conductor wire.

The head is then completed by a machining for defining the friction surface 65 (FIG. 3q) and optionally for defining a non-zero angle between the head gap width and the direction perpendicular to the movement of the support.

Figure 3K:
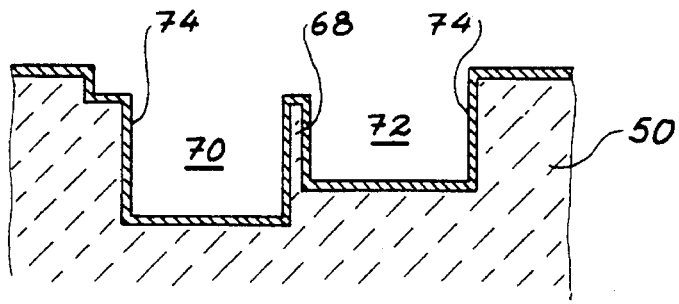
Figure 3L:
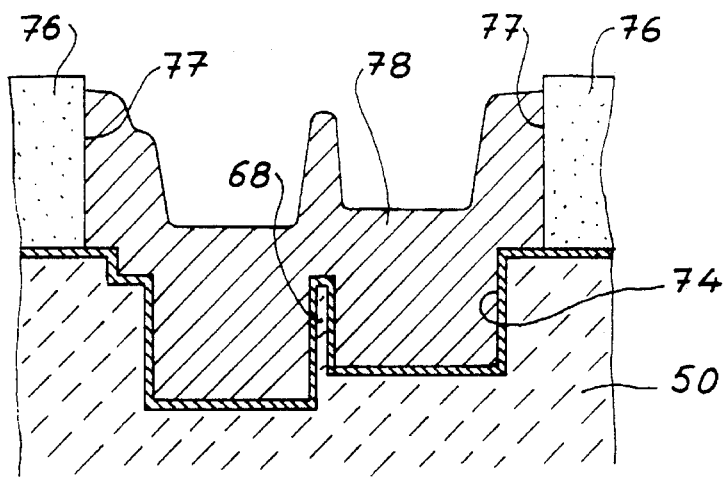
Figure 3M:
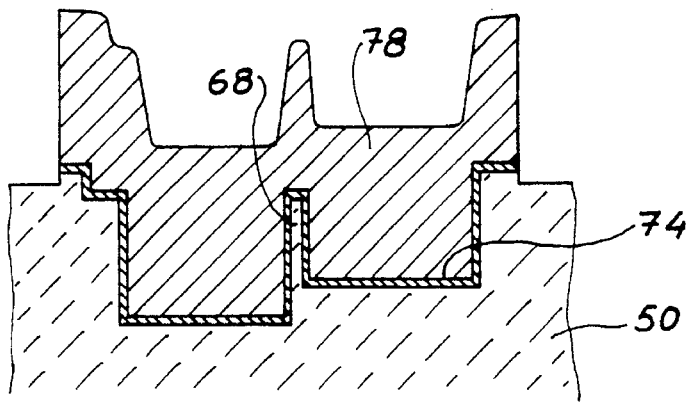
Figure 3N:
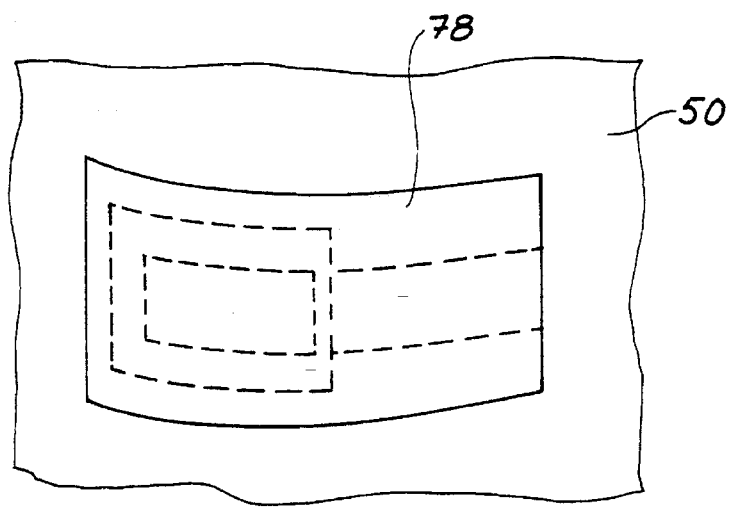
Figure 3O:
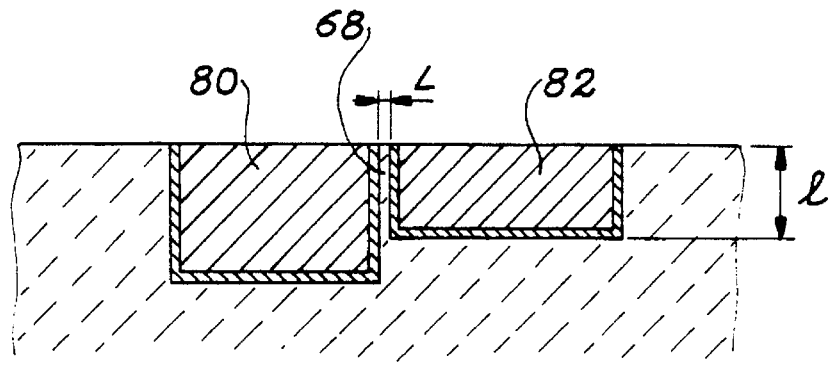
Figure 3P:
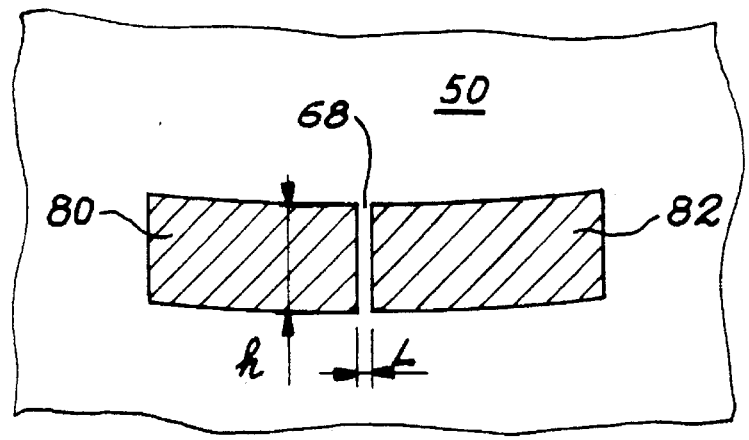
Figure 3Q:
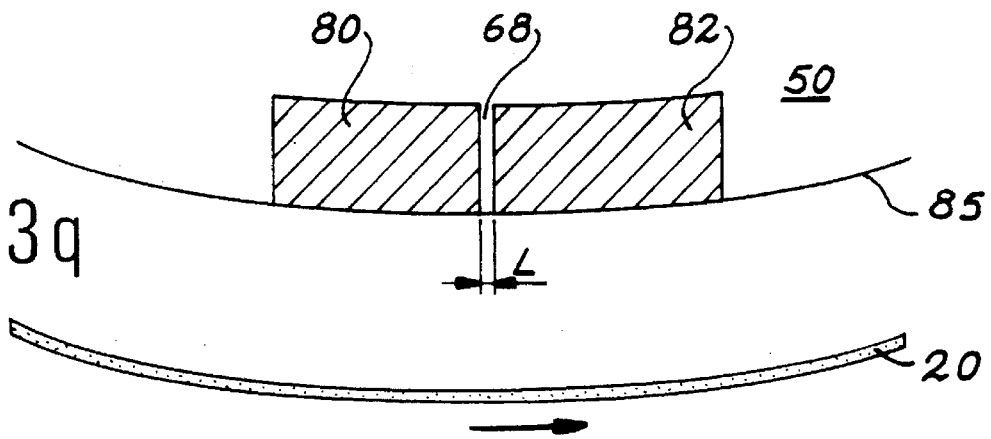

It is obvious that the formation of the magnetic part 78 is not necessarily obtained by electrolytic growth by the bias of a conductive underlayer, as illustrated in FIGS. 3k to 3l. It would also be possible to operate by vapour phase deposition, e.g. sputtering, and this is illustrated in FIGS. 4a to 4c.

Figure 4A:
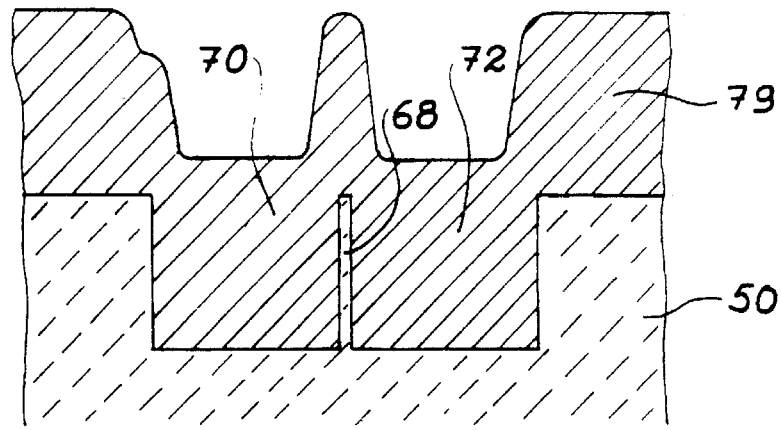
FIGS. 4a to 4c Show a variant of the magnetic deposit.
Figure 4B:
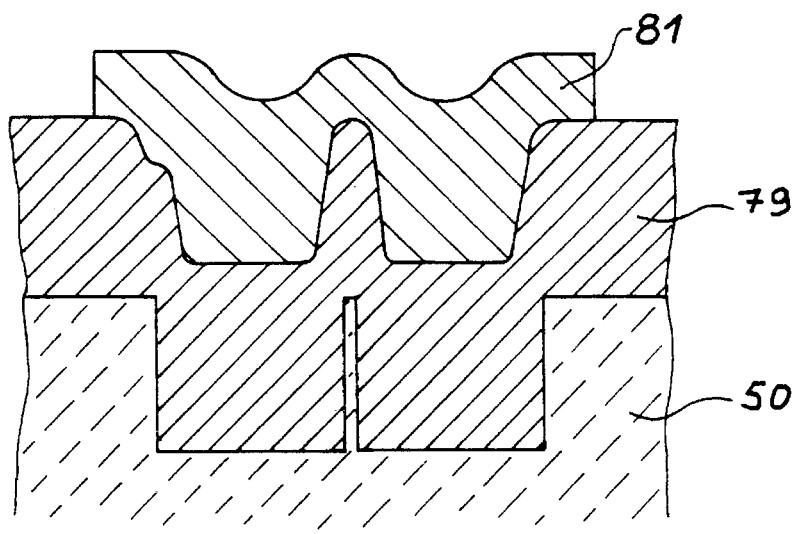
Figure 4C:
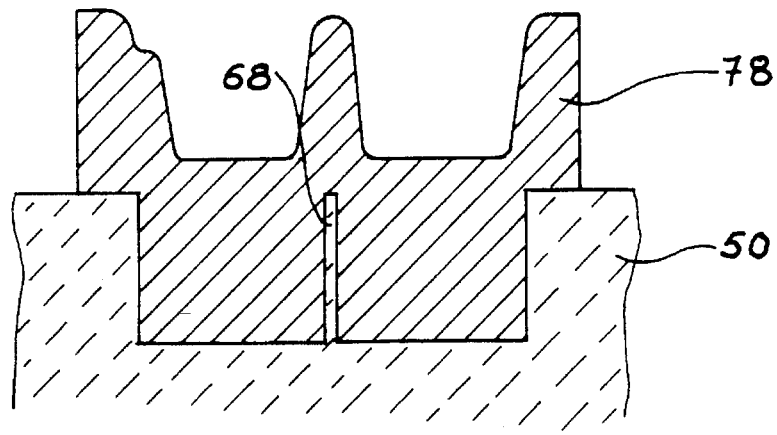

In FIG. 4a it is assumed that the starting product was the subassembly of FIG. 3i. A magnetic material 79 is deposited on the entire surface (FIG. 4a). This is followed by the deposition of a mask 81 covering the recesses 70, 72 and the periphery of the recesses (FIG. 4b). The magnetic material 79 is then etched through the mask 81 and the latter is eliminated. The subassembly of FIG. 4c is obtained, which corresponds to that of FIG. 3m, less the conductive layer 74.

Figure 5A:
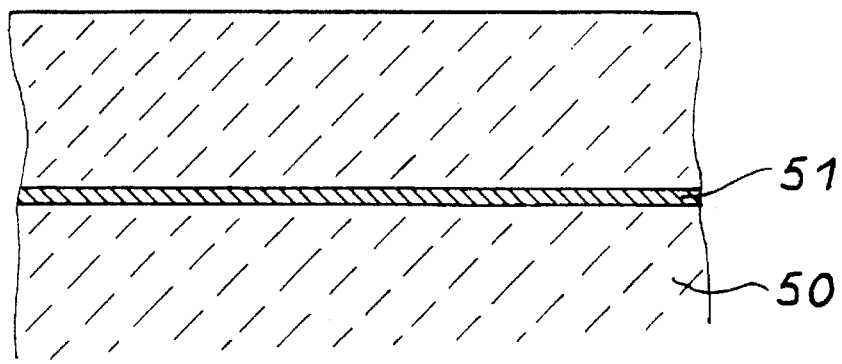
FIGS. 5a and 5b Show the use of a substrate with a buried barrier layer.
Figure 5B:
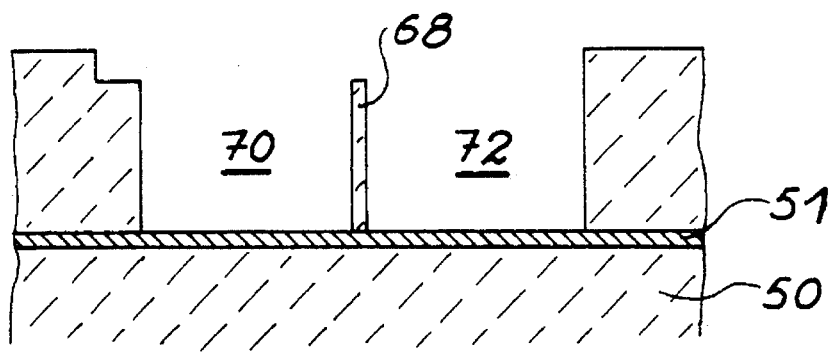

In order to avoid the obtaining of asymmetrical pole pieces, i.e. having different widths, a variant of the process according to the invention consists of using a substrate 50 with a buried barrier layer 51 (cf. FIG. 5a). Thus, during the stage of producing the first and second recesses, the etching of the latter stops at the layer despite the presence of the pre-recess (cf. FIG. 5b which is the equivalent of FIG. 3i). The remainder of the process remains unchanged.

This substrate with the buried layer can be obtained either by oxygen implantation in a substrate followed by annealing in such a way as to obtain a buried oxide layer according to the known silicon-on-insulator (SOI) method, or by boron implantation.

When the thickness of that part of the substrate above the buried layer is not adequate after implantation for obtaining the desired head gap width, the material constituting the substrate then undergoes epitaxy. Advantageously a monocrystalline material is used for the substrate.

The process according to the invention illustrates the production of the pole pieces of the magnetic circuit. However, the complete magnetic circuit can be produced at the same time as these pieces or in several deposition stages, the deposits occurring before the covering of the circuit by the superstrate.

The production process according to the invention lends itself well to a collective production procedure for heads like that described e.g. in WO 92/02015.

We claim:

1. A process for the production of a vertical magnetic head, comprising the steps of:

etching a substrate through a first mask to form a pre-recess of a predetermined depth;

forming a thin-material layer in said pre-recess constituting a second mask;

eliminating said thin layer over at least a part of a bottom of the pre-recess, while maintaining a section of the thin material layer along at least one wall of the pre-recess;

forming a third mask with an opening which exposes at least part of the pre-recess and substrate on a side of the at least one wall covered by the thin material layer;

etching through the third mask so that the section of the thin material layer remains in place and preserves an extended wall extending from the section of the thin material, the extended wall formed from the material constituting the substrate, said etching forming a first recess and a second recess separated by the extended wall of the material constituting the substrate;

eliminating all layers above the substrate after forming the first and second recesses;

filling the first and second recesses with a magnetic material;

planarizing parallel to the substrate at least up to the extended wall, to form two pole pieces separated by the extended wall to form a magnetic spacer; and machining to define a friction surface perpendicular to a surface of the substrate such that the magnetic spacer is level with said friction surface.

2. The process according to claim 1, further comprising the steps of forming a fourth mask with an opening freeing the first and second recesses and part of the substrate around the first and second recesses, followed by electrically depositing a conductive layer through the opening of the fourth mask, electrolytically growing a magnetic material using said conductive layer and then removing the electrode and the fourth mask.

3. The process according to claim 1, wherein the step of filling the first and second recesses is performed by physical vapor deposition of a magnetic material forming a fourth mask and etching the magnetic material into the first and second recesses and then removing the substrate around the first and second recesses and the fourth mask.

4. The process according to any one of claims 1 to 3, further comprising the steps of implanting a buried layer in the substrate, said buried layer forming a barrier layer to etching of the first and second recesses.

5. The process according to claim 4, wherein a part of the substrate above the buried layer is formed by a thin layer on which epitaxy is performed.

6. The process according to claim 1, wherein a material constituting the substrate is silicon.

* * * * *